Sept. 5, 1939.　　　　H. A. HUTCHINS　　　　2,171,792
ATTACHMENT FOR TRACTORS AND THE LIKE
Filed Jan. 27, 1937　　　3 Sheets-Sheet 1
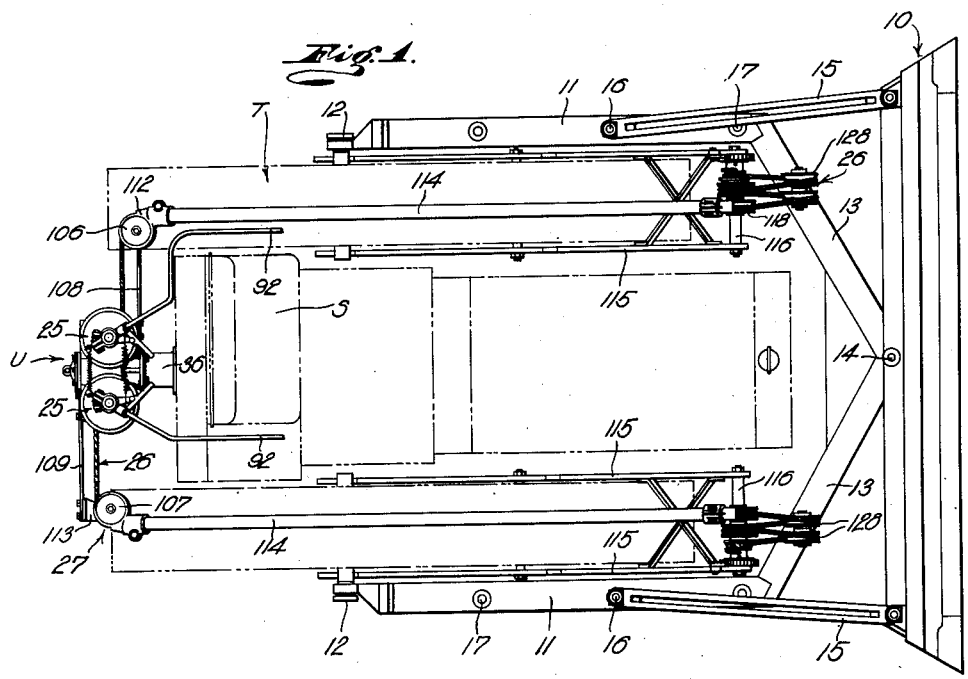
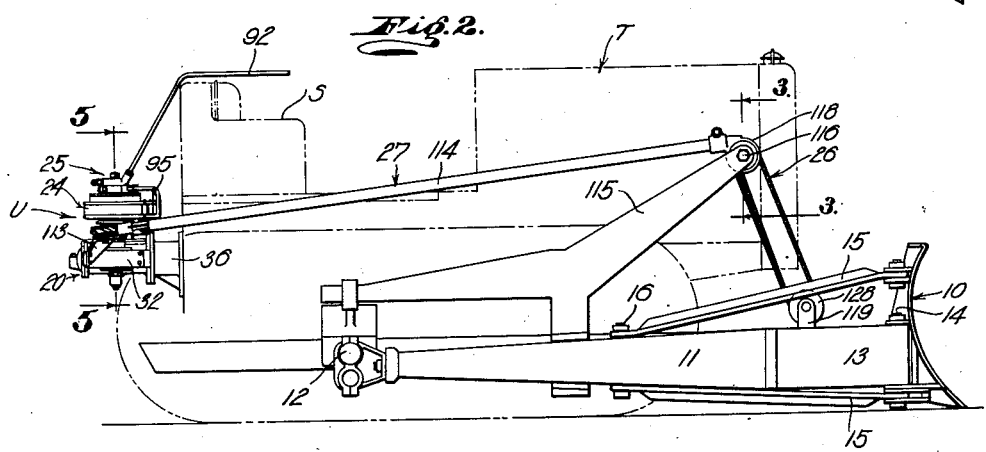
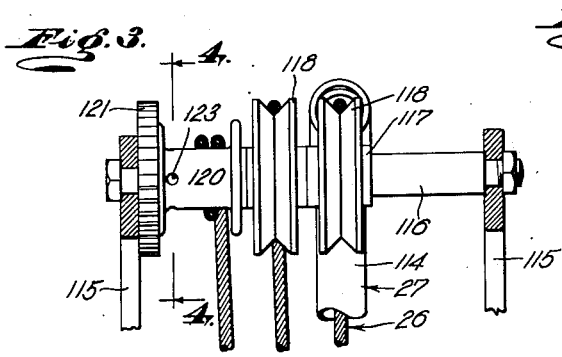
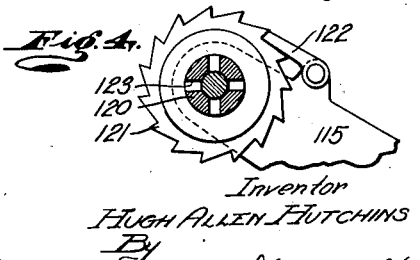
Inventor
HUGH ALLEN HUTCHINS
By
His Attorney

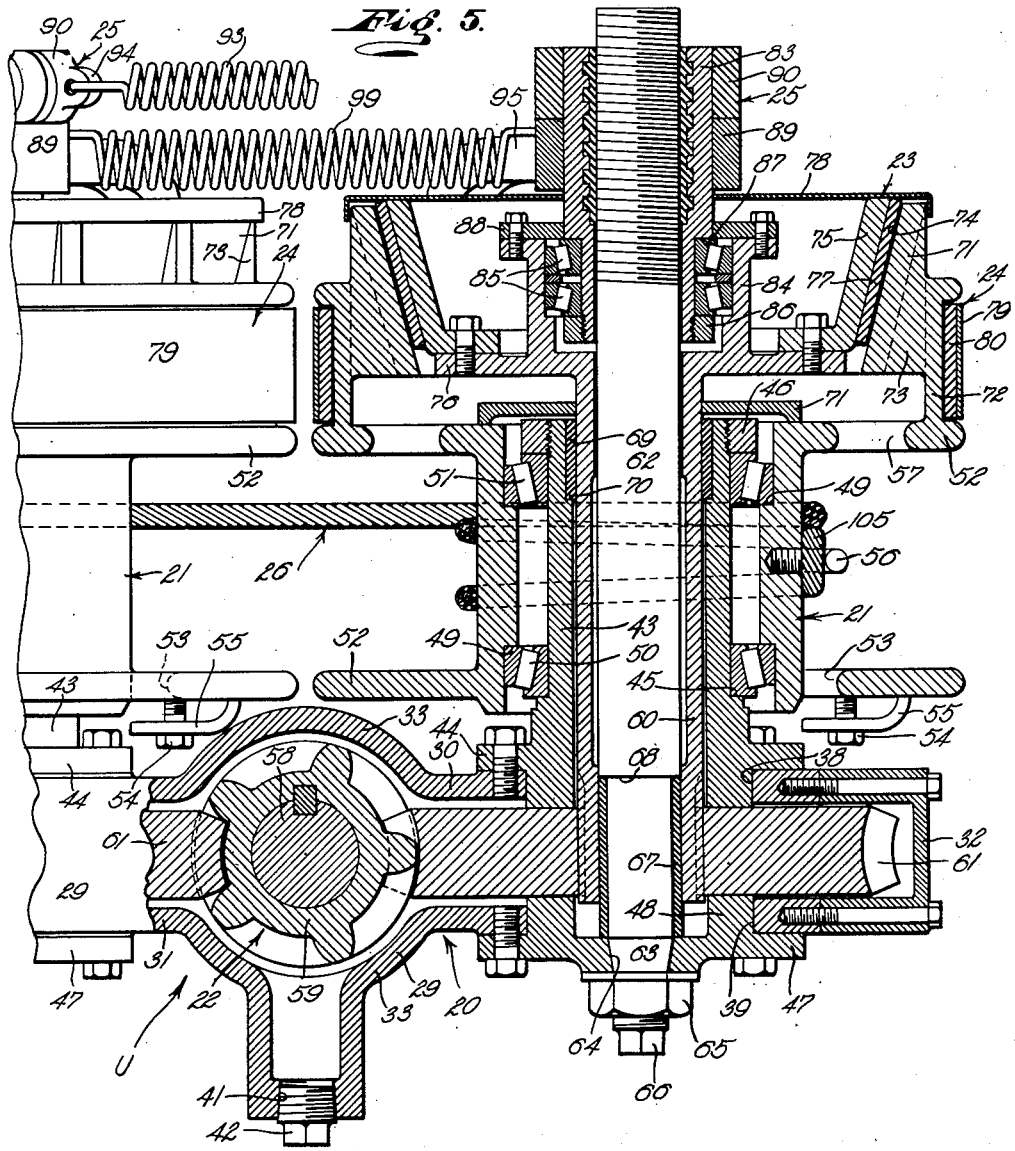

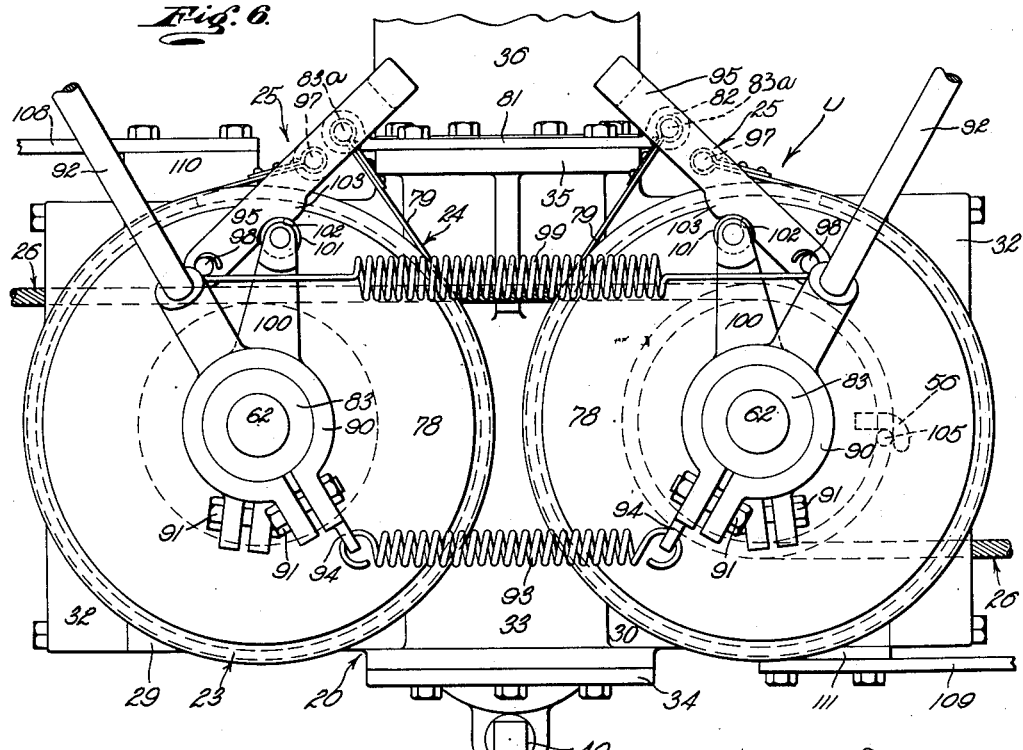
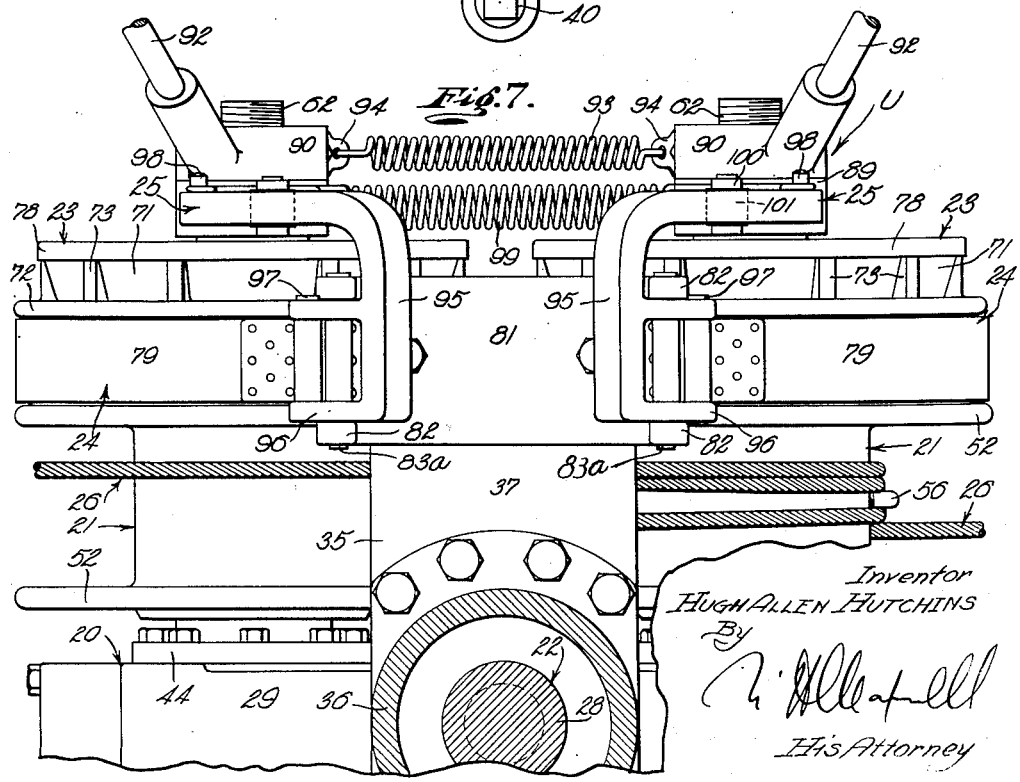

Patented Sept. 5, 1939

2,171,792

UNITED STATES PATENT OFFICE 2,171,792

ATTACHMENT FOR TRACTORS AND THE LIKE

Hugh Allen Hutchins, Los Angeles, Calif.

Application January 27, 1937, Serial No. 122,600

14 Claims. (Cl. 254—166)

This invention relates to attachments for tractors, trucks and the like, and relates more particularly to a power take-off or power unit to be applied to a tractor for the purpose of operating and controlling a bulldozer and other equipment carried and drawn by the tractor. A general object of this invention is to provide an improved, simplified and particularly effective power take-off or power unit of the character referred to.

Another object of this invention is to provide a power take-off attachment for a tractor or truck embodying vertical line operating drums rotatably supported from their lower ends. In accordance with the present invention the drums of the unit are dependably supported without the necessity of employing a support at their upper ends, as has been the general practice heretofore, whereby the unit is cheaper, lighter in weight, and easier to service than the power units heretofore introduced.

Another object of this invention is to provide a power unit or attachment of the character mentioned in which the clutches and the brakes for governing the drums are at the upper ends of the drums where they may be relined and repaired without disturbing the drums and where they do not accumulate grease etc. which may interfere with their operation.

Another object of this invention is to provide a practical power take-off unit for a tractor or the like having novel means for rotatably supporting the drums on a single housing in a manner so that the strains are imposed on the drums immediately adjacent the main casting of the housing.

Another object of this invention is to provide a power take-off or power unit of the character mentioned in which the wear resulting from the rotation of a line operating drum is taken by a single simple tubular part that may be easily reground or replaced and by replaceable bearings engaging the tubular part.

Another object of this invention is to provide a power take-off unit of the character mentioned embodying novel means for controlling the brakes of the winding drums.

Another object of this invention is to provide a power take-off unit of the character mentioned that embodies a very simple and compact drive for the drums.

Another and important object of this invention is to provide a power take-off or power unit of the character mentioned in which the lines for operating the equipment at the front of the tractor are guided forwardly from the rear portion of the tractor by sheaves carried by leaf-springs capable of flexing in any direction as required. The leaf-springs carrying the line guiding pulleys are simple, inexpensive and easily replaced and are just as effective as the heavy complicated and expensive pivoted arms heretofore employed to carry the line guiding sheaves.

Another object of this invention is to provide a tractor attachment of the character mentioned in which the strains resulting from the use or operation of the bulldozer or equipment at the front of the tractor are equally distributed on two lines, as distinguished from former attachments having a single line taking all the loads and strains.

Another object of this invention is to provide an attachment or power unit of the character mentioned embodying means for individually adjusting or taking up the two lines just referred to.

Another object of the invention is to provide an improved power take-off unit of the character mentioned in which no guide sheaves are required for the lines employed to operate equipment drawn by the tractor.

A further object of this invention is to provide an improved and practical power unit of the character mentioned that is compact, light in weight, and inexpensive, and that is strong and durable.

The various objects and features of my invention will be fully understood from the following detailed description of a typical preferred form and application of my invention, throughout which description reference is made to the accompanying drawings, in which:

Fig. 1 is a top or plan view of the unit or attachment provided by the present invention showing it in position on a typical tractor which appears in broken lines. Fig. 2 is a side elevation of the tractor and attachment illustrated in Fig. 1. Fig. 3 is an enlarged sectional view taken as indicated by line 3—3 on Fig. 2 and illustrating the means for adjusting one of the lines. Fig. 4 is a vertical detailed sectional view taken as indicated by line 4—4 on Fig. 3. Fig. 5 is an enlarged vertical detailed sectional view of the power unit proper with a portion of one of the drums appearing in side elevation and a portion of the said drum broken away, being a view taken as indicated by line 5—5 on Fig. 2. Fig. 6 is a top or plan view of the power unit proper illustrating the parts in the neutral position, and Fig. 7 is a fragmentary front elevation of the power unit illustrating the adapter and power take-off shaft in vertical cross section.

The device or attachment provided by this invention is adapted to be employed on tractors and the like of various sizes, makes and types, and is operable to control and operate grading and excavating equipment and devices of various natures. In the following detailed disclosure I will describe a typical embodiment of the invention as employed on a typical tractor to control or operate a bulldozer, it being understood that the invention is not to be construed as limited or restricted to the specific form or application of the invention about to be described.

The details of the tractor T illustrated in broken lines are omitted from the present description as they form no part of the present invention. The bulldozer 10 is of the angling type and is provided with a supporting frame having members 11 at the opposite sides of the tractor T. The frame members 11 of the bulldozer are pivotally connected at 12 with the tracks of the tractor. The members 11 are provided with forwardly and inwardly extending parts 13 joined at the front of the tractor. The bulldozer 10 is pivotally connected with the joined parts 13 at 14 so that it may be swung to various angular positions. The frame members 11 being pivotally supported at their rear ends allow the bulldozer to be raised and lowered relative to the ground level. Links 15 are pivotally connected to the bulldozer 10 adjacent its opposite ends end extend rearwardly to the frame members 11. Removable pins or bolts 16 secure the rear ends of the links 15 to the frame members 11. The pins 16 are insertable in longitudinally spaced openings 17 in the frame members 11 to provide for the proper supporting of the opposite ends of the bulldozer when it is swung to various angular positions. The bulldozer described above may be considered as typical of the type of equipment that may be operated by the attachment of the invention. The power take-off or attachment of the invention is operable to raise and lower the bulldozer 10 relative to the ground level.

The power take-off or attachment of the present invention provides, generally, a unit U at the rear end of the tractor T, comprising a housing 20, a pair of drums 21 rotatably carried by the housing 20, a drive 22 in the housing 20 for rotating the drums 21, clutches 23 and brakes 24 for controlling the drums 21 and means 25 for operating the clutches and brakes, lines 26 operated by a drum 21 of the unit U and means 27 guiding the lines 26 to the bulldozer 10 to operate the same.

The unit is intended to be mounted at the rear end of the tractor T to be driven by the usual power take-off shaft 28 provided on the tractor. The unit U may be conveniently located for the control and operation of the equipment drawn by the tractor T as well as the bulldozer 10 or other equipment at the front of the tractor. The housing 20 of the unit U is characterized by its simplicity and compactness. The housing 20 includes a hollow substantially horizontal body 29 having spaced upper and lower walls 30 and 31. respectively. The opposite ends of the hollow body 29 have access openings closed by suitable bolted on caps or covers 32. The intermediate portions of the body walls 30 and 31 are bowed or curved upwardly and downwardly, respectively, to provide the housing body 29 with an enlarged intermediate portion 33. The rear end of the enlarged body portion 33 is closed by a removable plate 34.

A substantially vertical flange 35 is provided on the forward end of the enlarged portion 33 and is bolted on an adapter 36. The adapter 36 is in turn bolted or otherwise secured to the frame of the tractor T to mount the unit U on the tractor. The adapter 36 is provided to facilitate the easy mounting of the unit on the tractor T and of course may be varied for application to tractors of various makes, types, etc. The housing 20 is mounted where the enlarged portion 33 of its body 29 is longitudinally aligned with the power take-off shaft 28. The flange 35 projects upwardly from the adapter 36 for the purpose to be hereinafter described. The upper and lower walls 30 and 31 are provided with vertically aligned openings 38 and 39, respectively. A pair of aligned openings 38 and 39 are spaced from each side of the longitudinal center of the housing 20, said pairs being equally spaced from said center. The housing is adapted to contain lubricant and a suitable lubricant admitting fitting 40 may be provided on the plate 34. An opening 41 is provided in the lower wall of the enlarged housing portion 33 to provide for the draining of lubricant from the housing and is normally closed by a plug 42.

The housing 20 further includes two spaced substantially vertical parts 43 which I will term housing extensions. The housing extensions 43 are tubular and are alike in size and shape. The lower end portions of the housing extensions 43 are received in the openings 38. Flanges 44 on the extensions 43 are bolted to the upper wall 30 of the housing body 29 to secure the extensions to the body. Each housing extension 43 has an annular upwardly facing shoulder 45 adjacent and above its securing flange 44. A thrust nut 46 is provided on the upper end portion of each housing extension 43. The extensions 43 rotatably support the drums 21 as will be hereinafter described and their peripheries may be machined adjacent the shoulder 45 and the nuts 46. The openings 39 in the lower body wall 31 are closed by removable plates 47. The plates 47 may be provided with annular flanges 48 projecting upwardly into the housing body 29 to oppose the lower ends of the extensions 43. It will be observed that the housing 20 is very compact and is characterized by the single integral body casting 29 which requires a minimum of machining.

The drums 21 are provided to operate the lines 26 and other lines that may be required for the control and operation of equipment on or drawn by the tractor T. In accordance with the invention the two drums 21 may be identical, as illustrated. The drums 21 are tubular and each drum surrounds a housing extension 43 with suitable clearance. Annular oppositely facing thrust shoulders 49 are provided on the interiors of the drums 21 adjacent their opposite ends. Suitable bearings 50 rotatably support the inner or lower ends of the drums 21 on the extensions 43 and operate between the thrust shoulders 45 and 49. Similar anti-friction bearings 51 rotatably support the upper portions of the drums 21 on the housing extensions 43 and operate between the nuts 46 and the upper shoulders 49. It is to be noted that the drums 21 are mounted close to the body 29 of the housing 20 and adjacent the vertical plane of the power take-off shaft 28.

Relative wide end flanges 52 are provided on the drums 21 to guide the lines and to prevent displacement of the lines from the drums. An opening 53 may be provided in the lower flange 52 of each drum 21 to receive the end portion of a line which is to be secured to the drum and wound thereon. Bolts 54 may be threaded in openings in the lower flanges 52 adjacent the openings 53 to operate spring clamps 55 for gripping the end portions of the cables. A stud or hook 56 is provided on the periphery of each drum 21 midway between its end flanges 52 to facilitate the connection of the lines with the drums as will be hereinafter described. It is to be understood that other means may be employed to associate the cables or lines with the drums 21, if desired.
A plurality of spaced openings 57 is provided in the upper flange 52 of each drum 21 to allow dirt and foreign matter to escape from the clutches 23, as will be subsequently described.

The drive 22 for operating the drums 21 includes a drive shaft 58 in the enlarged central portion 33 of the housing 20. The shaft 58 is rotatably supported by suitable bearings (not shown) in the housing and adapter 36 and is intended to be connected with the shaft 28 by a spline or key connection in the well known manner. A worm 59 is keyed or otherwise fixed to the shaft 58 to operate in the portion 33 of the housing 20. The drive 22 further includes a rotatable and longitudinally shiftable sleeve 60 extending longitudinally through each housing extension 43. The sleeves 60 extend downwardly into the housing body 29 and their lower portions carry worm wheels 61. The worm wheels 61 mesh with the worm 58 and are slidably keyed or splined on the sleeves 60. The lower ends of the housing extensions 43 and the flanges 48 are present at the opposite sides of the worm wheels 61 to prevent vertical displacement of the wheels and to take end thrusts from the wheels. The sleeves 60 driven or rotated by the gearing just described drive their respective drums 21 through the clutches 23.

The invention provides improved and particularly long wearing means for rotatably supporting the sleeves 60. A normally stationary shaft 62 extends longitudinally through each sleeve 60. The lower ends of the shafts 62 may be supported on the plates 47. In the particular structure illustrated the shafts 62 have tapered portions 63 fitting correspondingly tapered openings 64 in the plates 47. Nuts 65 are threaded on the shafts 62 to clamp against the plates 47 and hold the shafts against rotation and longitudinal movement. The lower end portions 66 of the shafts 62 are polygonal to be readily engaged by a wrench or turning tool for turning the shaft when the nuts 65 are loosened. The means for rotatably supporting the sleeves 60 include bushings 67 on the shafts 62 extending through the lower end portions of the sleeves. The bushings 67 effectively support the lower ends of the sleeves which carry the worm wheels 61. The lower ends of the bushings 69 may bear on the plates 47 while the upper ends of the bushings may engage shoulders 68 on the shafts 62. The shafts 62 project upwardly beyond the upper ends of the housing extensions 43 to form elements of the means 25 for operating the clutches 23 as will be hereinafter described. The means for supporting the sleeves 60 further include bushings 69 in the upper end portions of the housing extensions 43. The bushings 69 rotatably and shiftably support the upper portions of the sleeves 60. The bushings 69 may bear downwardly on shoulders 70 on the interiors of the housing extensions 43. If desired, cover plates 71 may be provided at the upper ends of the drums 21 to prevent the entrance of dirt and foreign matter to the interiors of the drums and the housing extensions 43. The sleeves 60 may be continuously rotated by the drive 22 to rotate the drums 21 through the medium of the clutches 23.

A clutch 23 is provided for controlling each line operating drum 21. It is a feature of the invention that the clutches 23 are located at the upper ends of their respective drums. Each clutch 23 includes a part rigid with a drum 21 and a part rigid with its related sleeve 60. Each clutch includes an annular or tubular flange 71 integrally joined with the upper flange 52 of a drum 21 through the medium of a brake drum 72. In practice circumferentially spaced webs 73 may connect the clutch flanges 71 with the brake drums 72. The internal surfaces 74 of the flanges 71 are pitched or conical. Each clutch further includes a hollow cone 75 within its flange 71. The cones 75 have their lower ends secured to radial flanges 76 on the upper ends of the sleeves 60. Friction material or lining 77 is provided on the outer surfaces of the cones 75 to cooperate with the surfaces 74. It will be apparent how cooperation of the lining 77 with the surfaces 74 transmits rotation between the sleeves 60 and the drums 21. The cones 75 of the clutches 23 are rigidly connected with the sleeves 60 to move longitudinally therewith and upward movement of the sleeves may release the clutches to free the drums 21. Cover plates 78 may extend across the upper ends of the clutch cones 75 and the upper ends of the clutch flanges 71.

The brakes 24 are provided to prevent rotation or backing up of the drums 21 when the clutches 23 are released and thus operate to retain the bulldozer 10 or other equipment operated by the power take-off in any one of the possible operating positions. Each brake 24 includes a brake drum 72 referred to above. The drums 72 may be integral tubular extensions of the upper flanges 52 of the winding drums 21. The brakes 24 further include flexible brake bands 79 extending around the drums 72 and carrying friction material or lining 80 for cooperating with the flanges. A bracket 81 is secured to the flange 35 of the housing 20 and its opposite ends are provided with spaced lugs 82. Pins 83a are carried by the lugs 82 and each pin pivotally connects one end of a brake band 79 with the relatively stationary bracket 81. The other ends of the brake bands 79 are connected with control parts of the means 25 as will be hereinafter described.

The means 25 are conveniently operable by the operator of the tractor T to control the clutches 23 and the brakes 24. Each means 25 is operable to engage the clutch 23 of one of the drums 21 to cause rotation of the drum and is also operable to simultaneously disengage the clutch 23 and release the brake 24 to leave the drum 21 in a free spooling condition. Each means 25 includes a nut 83 threaded on the upper end portion of a shaft 62. The nuts 83 may be relatively long and capable of extensive threading movement along the shafts 62. The threads of one nut 83 are righthand threads and those of the other nut 83 are lefthand threads. In accordance with the invention the cones 75 of the clutches 23 are associated with the nuts 83 to move vertically or longitudinally therewith and to freely rotate thereon. Each cone carrying flange 76 has a tubular boss or hub 84 surrounding a reduced lower portion of a nut 83. Bearings 85 within the bosses 84 engage about the nuts 83. The bearings 85 are thrust bearings and act between nuts 86 and shoulders 87, on the nuts 83 whereby the cones 75 are movable longitudinally with the nuts 83. Suitable cover plates 88 may be provided on the upper ends of the hubs 84. The nuts 83 project upwardly beyond the cover plates 78.

Each means 25 further includes collars 89 and 90 adjustably fixed to a nut 83. The collars 89 and 90 may be split and normally clamped on the nuts 83 by bolts 91. Each collar 90 carried an operating lever 92. The levers 92 project upwardly and forwardly to have handle portions disposed at the opposite sides of the operator's seat S of the tractor T. It will be apparent how swinging of the levers 92 is operable to turn the nuts 83 to thread them along the stationary shafts 62 to effect longitudinal movement of the clutch cones 75. Thus the turning of a lever 92 in one direction engages one of the clutches 23 and swinging of the lever in the other direction disengages the clutch. A spring 93 extends between lugs 94 on the collars 90 to yieldingly urge the levers 92 to the positions where the clutches 23 are released or disengaged.

Each means 25 further includes cams or levers 95 pivoted on the pins 83ª. The levers 95 may have spaced arms 96 pivotally supported on the pins 83ª. The levers 95 extend from the pins 83 in the general direction of the longitudinal axis of the related drum assembly. The arms 95 carry pivot pins 97 which pivotally connect the levers with the movable ends of the brake bands 79. The relationship of the pivotal mountings of the ends of the brake bands 79 is such that rotation of a drum 21 in one direction causes the related band 79 to wrap or tighten on the brake drum 72 while rotation of the drum 21 in the line tensioning direction merely causes dragging of the brake band 79. Spring means is provided to yieldingly urge the two levers 95 toward the positions where the brakes 24 are set or operative. In the structure illustrated pins 98 project from the rear portions of the levers 95 and a spring 99 extends between and connects with the pins 98 to urge the levers 95 inwardly or toward one another.

It is a feature of the invention that means are provided to hold the brakes 24 and the clutches 23 in the free-spooling positions or released positions when this is desired by the operator. Arms 100 project forwardly from the collars 89. The arms 100 are yoked at their outer ends to carry rotatable rollers 101. The rollers 101 are adapted to cooperate with the above described toggle levers 95. A notch 102 is provided in the rear edge or side of each lever 95. The notches 102 are adapted to receive the rollers 101. Rounded projections 103 are provided on the rear sides of the levers 95 immediately forward of the notches 102. The parts are related so that the rollers 101 are clear of or out of active engagement with the related levers 95 when the clutches 23 are engaged. When an operating lever 92 is moved to the position where the related clutch 23 is disengaged the roller 101 is still clear of the related lever 95. The roller 101 may engage the projection 103 when the clutch 23 is in the released position but the roller 101 does not roll over the projection unless the operator deliberately applies considerable force to the proper operating lever 92 to effect this movement. In other words the projection 103 is operable to prevent unintentional engagement of the roller 101 with the adjacent notch 102. When the operator wishes to have a completely free spool or drum 21 he operates the proper lever 92 to a position where the roller 101 rolls over the projection 103 into the notch 102. This operation moves the roller 101 past or over the center line extending between the pivotal axes of the lever 95 and the arm 100 so that cooperation of the roller 101 with the notch 102 resists the action of the spring 99 to return the released clutch 23 to the engaged position. When a roller 101 is engaged in a notch 102 the brake 24 of the related drum assembly is released and the clutch 23 is disengaged providing a free spool or drum. It will be observed that this free condition of the drum 21 is only obtained when the operator intentionally swings a lever 92 to engage a roller 101 in a notch 102. When a roller 101 is engaged in a notch 102 the lever 95 and the adjacent arm 100 form toggles to resist the spring 99 and positively hold the brake 24 and the clutch 23 released until the operator deliberately or forcibly swings the roller 101 out of the notch 102 by operation of the proper lever 92. While the action of one of the means 25 has been described above it is to be understood that the operation of the two means 25 is the same except that their levers 92 are swung in opposite directions as will be readily understood.

Separate cables or lines may be operated by the drums 21 for the control and operation of equipment drawn by the tractor T. When the unit U is employed for this purpose the lines are wound on the two spools 21 to pass from their inner sides or their sides closest to the longitudinal center line of the tractor T. This arrangement of the lines is important as no guide sheaves are necessary to guide the lines leaving the drums 21 immediately adjacent the center line of the tractor. It is believed that it will be readily understood how the drums 21 of the unit U may be employed to control and operate various classes of equipment that may be drawn by the tractor T.

The lines 26 illustrated in the drawings are provided to operate or control the bulldozer 10 at the forward end of the tractor T. When the lines are employed for this purpose they may both be wound on one drum 21 as illustrated, so that one line 26 passes laterally from the front of the drum and the other line 26 passes laterally from the rear of the drum. In practice the two lines 26 may form parts of a single length of cable wound on the drum 21 and secured to the drum intermediate its ends. The cable constituting the lines 26 may have a loop or eye 105 engaged over the hook 56 on the drum 21 which is employed for the operation of lines. With the lines 26 arranged as just described rotation of the drum 21 in one direction spools in both lines 26 while rotation of the drum in the other plays out both lines.

The means 27 for directing or guiding the lines 26 is an important feature of the present invention. The means 27 includes a guide pulley or sheave 106 for guiding the line 26 that passes from the front of the drum 21 and a similar sheave 107 for guiding the line 26 that passes laterally from the rear side of the drum. The invention provides novel and particularly effective means for supporting the sheaves 106 and 107 where they direct or guide the lines 26 to extend forwardly at opposite sides of the tractor T. This means comprises a leaf spring 108 secured to the housing 20 and projecting laterally from its forward end, and a similar leaf spring 109 secured to the housing 20 and projecting laterally from its rear side. The spring 108 has its inner end bolted to a suitable boss 110 on the forward side of the housing 20 and the spring extends outwardly or laterally in adjacent and substantially parallel relation to the line 26 passing from the forward side of the drum 21. The spring 109 has its inner end bolted to a boss 111 on the rear side of the housing 20 adjacent the drum 21 carrying the lines 26. The spring 109 extends outwardly or laterally from the boss 111 in substantially parallel relation to the line 26 passing from the rear side of the drum 21. The sheave 106 is secured to the outer end of the spring 108 by a suitable bracket 112 and the sheave 107 is secured to the outer end of the spring 109 by a similar bracket 113. The brackets 112 and 113 support their respective sheaves 106 and 107 in the proper incline or angular positions. The springs 108 and 109 are adapted to flex to permit all necessary movement of the sheaves 106 and 107 during the operation of the tractor T and the bulldozer 10. It will be noted that the springs 108 and 109 are simple, inexpensive and light in weight, and are easily replaced.

The means 27 further includes line guiding tubes 114 secured to the sheaves 106 and 107 or the supports of the sheaves and extending forwardly and upwardly to adjacent the front end of the tractor. The tractor is provided at its opposite sides with a pair of spaced upwardly and forwardly extending boom-like arms 115. The arms 115 are carried by the tracks of the tractor in any typical manner. A horizontal shaft 116 extends between the forward ends of each pair of arms 115. The forward ends of the tubes 114 are supported on the shafts 116 by suitable bearings 117. The lines 26 extend from the guide sheaves 106 and 107 and pass forwardly through the tubes 114 to the shafts 116.

Systems of sheaves are provided on the shafts 116 and the bulldozer 10 and the lines 26 operate over the systems of sheaves and have their dead ends fixed to the shafts 116. It will be apparent that the lines 26 may be compounded as desired by providing sheave systems with as many sheaves as required. In the case illustrated there are two sheaves 118 on each shaft 116 and two sheaves 128 on each part 13 of the bulldozer 10 for the compounding of the lines 26. The sheaves 128 may be carried by suitable bearing brackets 119 on the bulldozer parts 13. The lines 26 pass from the second or last sheaves 128 back to the shafts 116 where their dead ends are normally fixed.

The invention provides novel means for adjusting or taking up the dead ends of the lines 26. Take-up spools 120 are rotatable on the shafts 116 and the dead ends of the lines 26 are wrapped on and suitably fixed to the spools 120. The outer ends of the spools 120 are provided with circumferential series of ratchet teeth 121. Ratchet dogs 122 are pivoted to the adjacent arms 115 and cooperate with the ratchet teeth 121 to normally prevent rotation of the take-up spools 120 against the strains or turning forces imposed on the spools. Suitable means are provided to effect rotation of the take-up spools 120. In the case illustrated circumferentially spaced openings 123 are provided in the spools 120 to receive a rod or turning tool for turning the spools. By manipulating or turning the take-up spools 120 the individual lines 26 may be adjusted and the lines may be individually wrapped on the take-up spools 120 to remove slackness from the lines whereby they operate in the desired manner. It will be noted that the strains resulting from operation of the bulldozer 10 are equally divided between the two lines 26 which are connected with the bull-dozer 10 at points equally spaced from its center. In the event that slackness develops in a line 26 it may be readily removed by rotating the take-up spool 120 to remove the slackness.

In operation it may be assumed that the engine or prime mover of the tractor T is continuously operating to rotate the shaft 28. The drive 22 accordingly continuously rotates the sleeves 60 and the clutch cones 75 secured to the sleeves. When the drums 21 are idle the operating levers 92 are in positions where the clutches 23 are released and where the brakes 24 are set or operative. The brakes 24 operate to normally prevent rotation of the drums 21 in the unspooling direction. Assuming that the lines 26 are wound on one of the drums 21 and are operatively connected with the bulldozer 10 as illustrated, the operator may raise the bulldozer by moving the proper lever 92 to a position where the clutch 23 of the said drum 21 is engaged. The clutch 23 is engaged by turning the lever 92 to thread the nut 83 downwardly on the stationary shaft 62 and move the clutch cone 75 downwardly to bring the lining 77 in active engagement with the surface 74. As the cone 75 is continuously rotating the engaging of the clutch 23 results in rotation of the drum 21 in a direction to wind in the lines 26. During this rotation of the drum 21 the brake 24 is inoperative, that is, it does not materially resist rotation of the drum in the line spooling direction. When the drum 21 is rotated to take in the lines 26 the lines of course raise the bulldozer 10. The springs 108 and 109 support the sheaves 106 and 107, respectively, to properly guide the lines 26 and yet allow the necessary shifting of the sheaves when the tractor is in operation.

When the bulldozer 10 has been raised sufficiently the operator moves the proper lever 92 to turn the nut 83 and thread it upwardly on the shaft 62 to disengage the clutch 23. Immediately upon disengagement of the clutch 23 the brake 24 sets or operates. As described above, the brake 24 is of the wraparound type that automatically grips or engages when the drum 21 tends to turn in the unspooling direction. Thus the brake 24 operates to hold the drum 21 against rotation and operates to hold the bulldozer 10 in the raised position.

To lower the bulldozer 10 the operator swings the proper lever 92 to bring the roller 101 into active engagement with the adjacent lever 95. The roller 101 is operable to act on the lever 95 or its projection 103 to swing the lever to a position where the brake 24 is released. This action of the roller 101 is accompanied by turning of the nut 83 in a direction to disengage or further disengage the clutch 23. With the brake 24 and the clutch 23 both released, the weight of the bulldozer 10 and the load carried thereby, if any, causes downward swinging of the bulldozer and unreeling of the lines 26 from the drum 21. Lowering of the bulldozer 10 may be stopped at any point by swinging the proper lever 92 to the position where the roller 101 disengages from the adjacent lever 95, whereupon the spring 99 automatically swings the lever 95 to re-engage the brake 24. The brake band 79 thereupon automatically wraps onto its drum 72 to stop rotation of the drum 21. If it is desired to leave the brake 24 and the clutch 23 in the released condition for any substantial period, the operator merely swings the proper lever 92 to the position where the roller 101 engages in the notch 102 of the adjacent lever 95. With the parts in this position the brake 24 is held released and the clutch 23 is in its released position so that the bulldozer 10 may rest on the ground.

It is to be understood that the drums 21 of the unit U may be individually controlled and operated simultaneously by the two control means 25 to effect the desired or necessary operation of lines operated by the drums. Thus when the unit U is employed to operate equipment drawn by the tractor it may be desirable to take up the line on one drum 21 and allow it to unspool from the other drum 21. The clutches 23 may be adjusted by loosening the nut 65 and then turning the shafts 62 by means of the polygonal portions 66. This rotation of the shafts 62 results in threading of the nuts 83 and adjustment of the clutch cones 75 relative to the flanges 71. The drums 21 are located at opposite sides of the longitudinal center line of the tractor and the lines may pass rearwardly from the drums immediately adjacent said center line so that no guide sheaves are required for the lines when the unit U is employed to control or operate apparatus drawn by the tractor. The unit U embodying the two drum assemblies supported at their lower ends only is very small, compact and light in weight. The lines pass from the drums 21 adjacent the housing 20 to impose minimum strains on the housing and the other parts. Further, the supporting of the drum assemblies at their lower ends leaves their upper ends free to receive th clutches 23 and the various elements of the controls 25. The clutches 23 being above the drums 21 do not accumulate grease, etc., that may interfere with their operation. The drums 21 and the parts connected therewith are dependably and effectively supported.

The driving sleeves 60 are internally supported at the upper ends of the drums 21 by the bushings 69. The sleeves 60 which receive practically all the wear resulting from rotation of the drums 21 and the other parts may be easily removed for re-grinding or replacement. The single integral housing body 29 requires a minimum of machining and yet is such that the parts of the drive 22, the sleeves 60 and the various other parts may be removed from it when necessary.

When the apparatus is employed for the control and operation of the bulldozer 10 the means 27 guides the lines 26 so that two lines operated by a single drum 21 assume equal loads. The lines 26 extending forwardly to the opposite sides of the tractor are associated with the bulldozer 10 through the above-described systems of sheaves 118 and 128 to raise or operate the bulldozer at points spaced from its center and under the control of the single drum. The lines 26 may be adjusted or taken up at any time by means of the take-up spools 120 so that the forces on the lines 26 may be maintained equal at all times. The springs 108 and 109 are important as they assure the proper supporting of the guide sheaves 106 and 107 and allow the required movement of the sheaves. The springs 108 and 109 are small and light in weight and may be easily and inexpensively replaced when necessary.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A power take-off unit for a tractor or truck comprising, a housing carrying an upwardly projecting tubular part, a rotatable drum above the housing supported by said part, and a drive for the drum including a shaft extending from the housing through said part, and a clutch above the drum for transmitting rotation from the shaft to the drum.

2. A power take-off unit for a tractor or truck comprising, a supporting structure to be attached to the tractor, a tubular part rigid with and projecting upwardly from the structure, a drum above the structure rotatably supported on said part, a rotatable member extending from the structure and passing upwardly through the said part, a drive for rotating the member, and a clutch above the drum for transmitting rotation from the member to the drum.

3. A power take-off unit for a tractor or truck comprising, a housing having an extension projecting from its upper side, a drum rotatable on the extension, a rotatable member extending through the extension, a drive in the housing rotating the member, and a clutch above the drum for transmitting rotation from the member to the drum.

4. A power take-off unit for a tractor or truck comprising, a housing having an extension projecting from its upper side, a drum rotatable on the extension, a rotatable member extending through the extension, a shaft carried by the housing and extending upwardly through the member to rotatably support the same, a drive in the housing rotating the member, and a clutch above the drum for transmitting rotation from the member to the drum.

5. A power take-off unit for a tractor comprising, a housing having an extension projecting from its upper side, a drum rotatable on the extension, a relatively stationary shaft carried by the housing to extend upwardly through the extension, a rotatable sleeve on the shaft extending upwardly through the extension rotatably supported by the shaft and extension, a clutch at the upper end of the extension for transmitting rotation between the sleeve and the drum, and a drive in the housing for rotating the sleeve.

6. In a power take-off attachment for a tractor, a housing to be attached to the tractor, an upwardly projecting tubular extension on the housing, a drum rotatable on the extension, a driven member extending upwardly through the extension, and a clutch at the upper end of the extension for transmitting rotation from the member to the drum.

7. In a power take-off attachment for a tractor, a housing to be attached to the tractor, an upwardly projecting tubular extension on the housing, a drum rotatable on the extension, a longitudinally shiftable and rotatable member extending through the extension, a clutch part on the upper end of the drum, a clutch part on the member engageable with the first named part upon longitudinal movement of the member, and means for effecting longitudinal movement of the member.

8. In a power take-off attachment for a tractor, a housing to be attached to the tractor, an upwardly projecting tubular extension on the housing, a drum rotatable on the extension, a tubular rotatable and longitudinally shiftable member extending through the extension, a drive in the housing for rotating the member, a clutch part on the upper end of the drum, a clutch part on the member engageable with the first named part, and means at the upper end of the member for moving the same longitudinally.

9. In a power take-off attachment for a tractor, a housing to be attached to the tractor, an upwardly projecting tubular extension on the housing, a drum rotatable on the extension, a tubular rotatable and longitudinally shiftable member extending through the extension, a drive in the housing for rotating the member, a clutch part on the upper end of the drum, a clutch part on the member engageable with the first named part, and means at the upper end of the member for moving the same longitudinally, said means including a relatively stationary shaft extending through the member, and a nut threaded on the shaft to shift the second mentioned clutch part.

10. In a power take-off attachment for a tractor, a tubular support, a winding drum rotatable on the support, a tubular rotatable and longitudinally shiftable member extending through the support, a stationary shaft extending through the member, means for rotating the member, a brake drum on the winding drum, a clutch part on the winding drum, a clutch part on the member cooperable with the first named clutch part, a nut threaded on the shaft for shifting the second mentioned clutch part, a band for cooperating with the brake drum, means urging the band to the operative position, and a control operable to release the brake following release of the clutch parts including a part on the nut, and a lever on the brake band engageable by the said part.

11. In a power take-off attachment for a tractor, a tubular support, a winding drum rotatable on the support, a tubular rotatable and longitudinally shiftable member extending through the support, a stationary shaft extending through the member, means for rotating the member, a brake drum on the winding drum, a clutch part on the winding drum, a clutch part on the member cooperable with the first named clutch part, a nut threaded on the shaft for shifting the second mentioned clutch part, a band for cooperating with the brake drum, means urging the band to the operative position, and a control operable to release the brake following release of the clutch parts including a lever operatively connected with the brake band and having a notch, and a part on the nut cooperable with the lever and adapted to engage in the notch to hold the brake released.

12. In a power take-off attachment for a tractor, a housing to be secured at the rear of the tractor, a substantially vertical drum above the housing, means on the housing for driving the drum, a line wound on the drum and passing laterally therefrom, a leaf spring attached to the housing and projecting laterally therefrom, a sheave on the spring guiding the line forwardly, and means adjustably fixing the dead end of the line comprising a take-up spool on which the line is wound, and releasable ratchet means normally preventing turning of the spool.

13. In a power take-off attachment for a tractor, a housing to be attached to the tractor, an upwardly projecting tubular extension on the housing, a drum rotatably supported on the extension, a driven member extending upwardly through the extension, a clutch at the upper end of the extension operable to transmit rotation from the driven member to the drum, and a brake at the upper end of the drum for controlling rotation of the drum.

14. In a power take-off attachment for a tractor, a housing to be attached to the tractor, an upwardly projecting tubular extension on the housing, a drum rotatably supported on the extension, a driven member extending upwardly through the extension, a clutch at the upper end of the extension operable to transmit rotation from the driven member to the drum, the clutch comprising cooperable relatively shiftable clutch parts associated with the drum and driven member, a fixed element and a nut threaded on the fixed element to shift one clutch part relative to the other, a brake for controlling the drum, and means for governing the brake comprising a part on the nut and a part on the brake engageable by the last named part.

HUGH ALLEN HUTCHINS.